(12) United States Patent
Jung et al.

(10) Patent No.: US 10,929,612 B2
(45) Date of Patent: Feb. 23, 2021

(54) NEURAL NETWORK MEMORY COMPUTING SYSTEM AND METHOD

(71) Applicant: Electronics and Telecommunications Research Institute, Daejeon (KR)

(72) Inventors: Ho Young Jung, Daejeon (KR); Hyun Woo Kim, Daejeon (KR); Hwa Jeon Song, Daejeon (KR); Eui Sok Chung, Daejeon (KR); Jeon Gue Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 139 days.

(21) Appl. No.: 16/217,804

(22) Filed: Dec. 12, 2018

(65) Prior Publication Data

US 2019/0325025 A1     Oct. 24, 2019

(30) Foreign Application Priority Data

Apr. 24, 2018  (KR) .......................... 10-2018-0047371

(51) Int. Cl.
*G06F 40/30* (2020.01)
*G06N 3/04* (2006.01)
*G06N 3/08* (2006.01)

(52) U.S. Cl.
CPC .............. *G06F 40/30* (2020.01); *G06N 3/04* (2013.01); *G06N 3/08* (2013.01)

(58) Field of Classification Search
CPC ............. G06F 40/30; G06N 3/04; G06N 3/08

USPC ............................................................. 704/9
See application file for complete search history.

(56) References Cited

U.S. PATENT DOCUMENTS

| 2001/0053968 | A1* | 12/2001 | Galitsky ................. G06F 16/38 |
| | | | 704/9 |
| 2016/0140187 | A1 | 5/2016 | Bae et al. |
| 2017/0201562 | A1 | 7/2017 | Moon et al. |
| 2017/0228638 | A1 | 8/2017 | Danihelka et al. |
| 2017/0228643 | A1 | 8/2017 | Kurach et al. |
| 2019/0034814 | A1* | 1/2019 | Amer ................... G06K 9/6234 |

OTHER PUBLICATIONS

Lu Jiang et al., Bridging the Ultimate Semantic Gap: A Semantic Search Engine for Internet Videos, Jun. 2015, 27 pages (Year: 2015).*

* cited by examiner

*Primary Examiner* — Quynh H Nguyen
(74) *Attorney, Agent, or Firm* — Kile Park Reed & Houtteman PLLC

(57) ABSTRACT

Provided are a neural network memory computing system and method. The neural network memory computing system includes a first processor configured to learn a sense-making process on the basis of sense-making multimodal training data stored in a database, receive multiple modalities, and output a sense-making result on the basis of results of the learning, and a second processor configured to generate a sense-making training set for the first processor to increase knowledge for learning a sense-making process and provide the generated sense-making training set to the first processor.

18 Claims, 6 Drawing Sheets

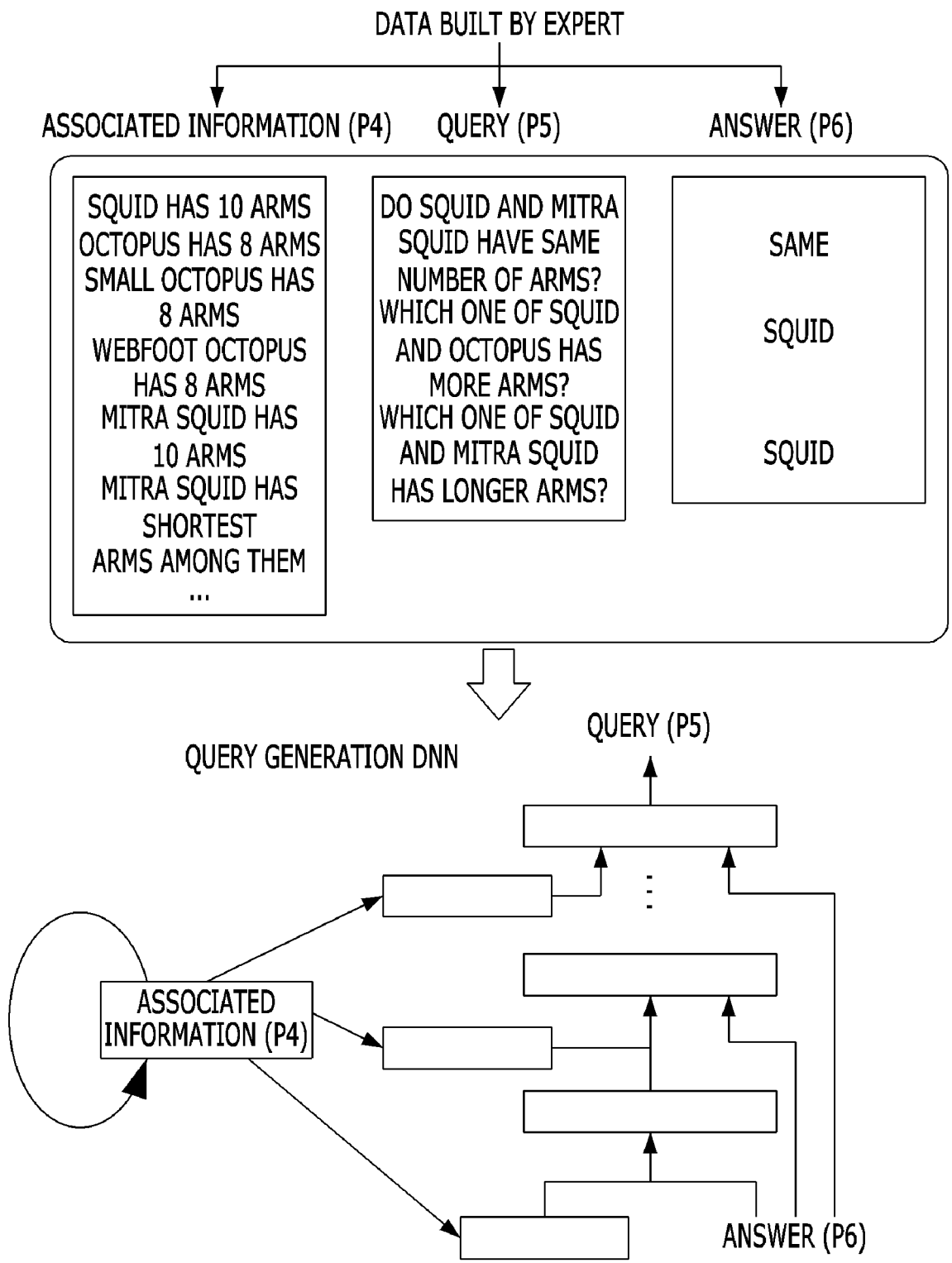

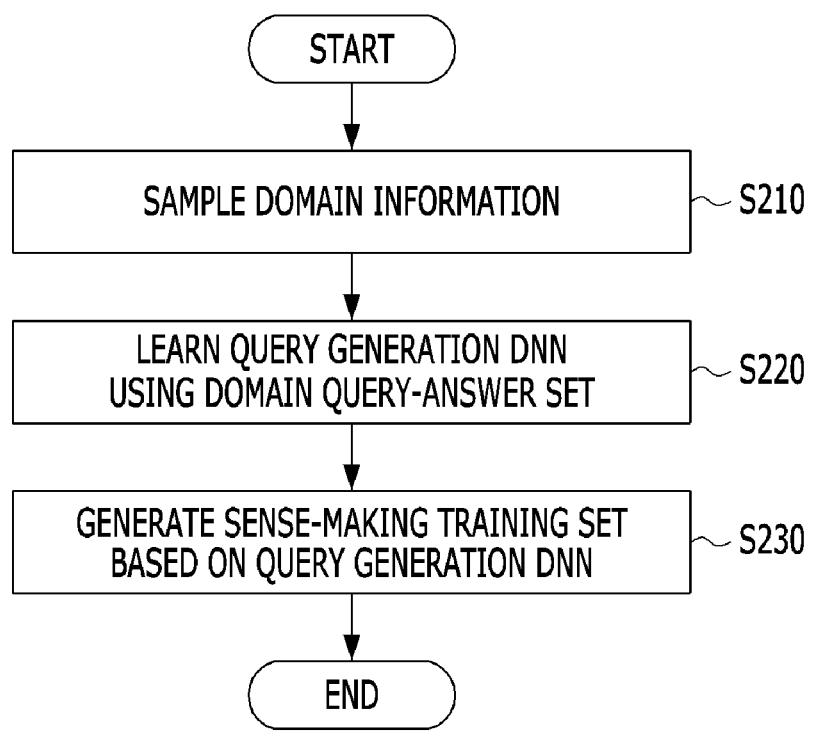

NEURAL NETWORK MEMORY COMPUTING SYSTEM AND METHOD

CROSS-REFERENCE TO RELATED APPLICATION

This application claims priority to and the benefit of Korean Patent Application No. 2018-0047371, filed on Apr. 24, 2018, the disclosure of which is incorporated herein by reference in its entirety.

BACKGROUND

1. Field of the Invention

The present invention relates to a neural network memory computing system and method.

2. Discussion of Related Art

Current deep neural network (DNN) technology has a structure which is very efficient for recognizing names of various modalities but is not efficient for sense making in addition to name recognition.

In other words, meaning information of various modality input is configured as output so that training for sense making may be made possible with a structure for learning a DNN. However, a large amount of training data for sense making is required.

To solve this problem, it is necessary to learn a process of grasping meanings of various modality input and infer a meaning of an unknown input. Therefore, a technology is required for the purpose.

SUMMARY OF THE INVENTION

The present invention is directed to providing a neural network memory computing system and method for learning a process of grasping a meaning of a complex modality input and for generating basic sense-making multimodal training data.

However, objectives of the present invention are not limited to that mentioned above, and other objects may exist.

According to an aspect of the present invention, there is provided a neural network memory computing system for increasing knowledge for grasping a meaning of input multiple modalities, the system including a first processor configured to learn a sense-making process on the basis of sense-making multimodal training data stored in a database, receive multiple modalities, and output a sense-making result on the basis of results of the learning and including a second processor configured to generate a sense-making training set for the first processor to increase knowledge for learning a sense-making process and provide the generated sense-making training set to the first processor.

The first processor may embed the sense-making multimodal training data in units of vectors having a preset magnitude and generate a sense-making training set on the basis of the vectors.

The first processor may learn a process of extracting features of visual and auditory pieces of the sense-making multimodal training data using a deep neural network (DNN), output final hidden-layer values of the DNN for the visual and auditory pieces of sense-making training data, and embed the final hidden-layer values in the vectors.

For a piece of the sense-making multimodal training data corresponding to text, the first processor may learn a DNN-based word vector space using a previously provided text corpus, output word vector values of the text, and embed the word vector values in the vectors.

When associated information corresponding to a query and answer for sense making is not stored in a memory space, the first processor may perform tagging for writing the associated information in the memory space and tag the input query as a sense-making training input and a sense-making training output to generate the sense-making training set for the query and answer.

The first processor may classify input tagged for writing as a text modality, a visual modality, and an auditory modality among multiple modalities included in the sense-making training set and store the classified input in the memory space.

The first processor may set modalities tagged as the sense-making training input among the multiple modalities included in the sense-making training set as input to a DNN, set modalities tagged as the sense-making training output as output of the DNN, and learn the DNN.

The first processor may embed the input multiple modalities including a query and associated information in units of vectors having a preset magnitude, repeatedly input the embedded multiple modalities including the query and associated information in a DNN, and output the sense-making result.

Using a weight output from the DNN, the first processor may update a piece of data whose sense-making result is related to associated information corresponding to a query and answer for sense making among pieces of data in a memory space in which the associated information is stored.

The second processor may sample domain information and learn a query generation DNN which generates the sense-making training set using a domain query-answer set constructed on the basis of the sampled domain information.

The second processor may call a text input corresponding to an answer and modality information whose associated information is related to the text input, convert the text input and the modality information into vectors, set the vectors as input to the query generation DNN, set text converted into a vector corresponding to a query as an output of the query generation DNN, and learn the query generation DNN.

According to another aspect of the present invention, there is provided a neural network memory computing method for increasing knowledge for grasping a meaning of input multiple modalities, the method including: embedding sense-making multimodal training data stored in a database in vectors having a preset magnitude; generating a sense-making training set on the basis of the vectors; learning a DNN on the basis of multiple modalities included in the generated sense-making training set; and outputting results of grasping a meaning of input multiple modalities on the basis of the learned DNN.

The embedding of the sense-making multimodal training data in the vectors having the preset magnitude may include learning a process of extracting features of visual and auditory pieces of the sense-making multimodal training data using the DNN, outputting final hidden-layer values of the DNN for the visual and auditory pieces of sense-making training data, and embedding the final hidden-layer values in the vectors.

The embedding of the sense-making multimodal training data in the vectors having the preset magnitude may include, for a piece of the sense-making multimodal training data corresponding to text, learning a DNN-based word vector space using a previously provided text corpus, outputting word vector values of the text, and embedding the word vector values in the vectors.

The generating of the sense-making training set on the basis of the vectors may include: determining whether associated information corresponding to a query and answer for sense making is stored in a memory space; when it is determined that the associated information is not stored in the memory space, performing tagging for writing the associated information in the memory space; and tagging an input query as a sense-making training input and a sense-making training output to generate the sense-making training set for the query and answer.

The learning of the DNN based on the multiple modalities included in the generated sense-making training set may include: classifying input tagged for writing as a text modality, a visual modality, and an auditory modality among the multiple modalities included in the sense-making training set and storing the classified input in the memory space; setting modalities tagged as the sense-making training input among the multiple modalities included in the sense-making training set as input to the DNN; and setting modalities tagged as the sense-making training output as output of the DNN and learning the DNN.

The outputting of the results of grasping a meaning of the input multiple modalities based on the learned DNN may include embedding the multiple modalities including an input query and associated information in units of vectors having the preset magnitude and include repeatedly inputting the embedded multiple modalities including the query and associated information in the DNN and outputting sense-making results.

The outputting of the results of grasping a meaning of the input multiple modalities based on the learned DNN may further include updating, using a weight output from the DNN, a piece of data whose sense-making result is related to associated information corresponding to a query and answer for sense making among pieces of data in a memory space in which the associated information is stored.

According to another aspect of the present invention, there is provided a neural network memory computing method for increasing knowledge for grasping a meaning of input multiple modalities, the method including: sampling domain information; learning a query generation DNN using a domain query-answer set constructed on the basis of the sampled domain information; and generating a sense-making training set on the basis of the query generation DNN. Here, the learning of the query generation DNN includes calling a text input and modality information whose associated information is related to the text input, converting the text input and the modality information into vectors, setting the vectors as input to the query generation DNN, setting text converted into a vector corresponding to a query as an output of the query generation DNN, and learning the query generation DNN.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is a diagram illustrating a query generation deep neural network (DNN) and a sense-making training set; and FIGS. 5A and 5B are flowcharts illustrating a neural network memory computing method according to an exemplary embodiment of the present invention.

DETAILED DESCRIPTION OF EXEMPLARY EMBODIMENTS

Figure 1:
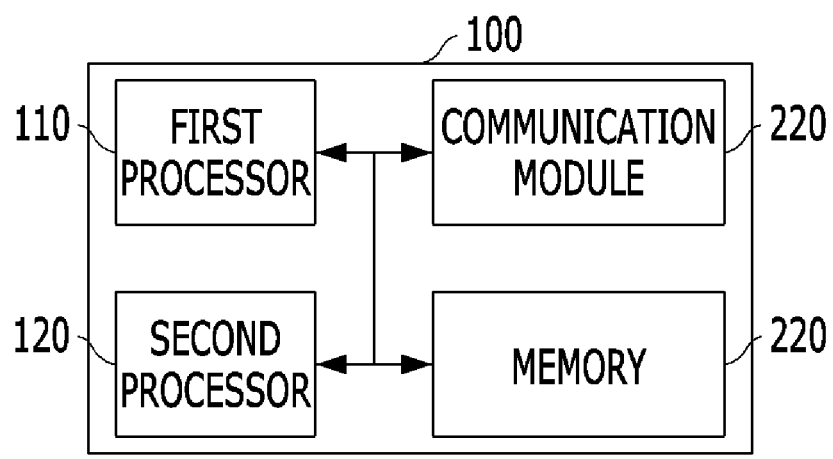
FIG. 1 is a block diagram of a neural computing system according to an exemplary embodiment of the present invention.

Hereinafter, exemplary embodiments of the present invention will be described in detail with reference to the accompanying drawings so that those of ordinary skill in the art may easily implement the exemplary embodiments. The present invention may, however, be embodied in many different forms and is not limited to the embodiments set forth herein. In the drawings, parts irrelevant to the description are omitted to clearly describe the present invention Throughout the specification, when a certain part is referred to as "including" a certain component, this does not exclude other components unless described otherwise, and other components may be further included.

The present invention relates to a neural network memory computing system 100 and method for increasing knowledge for grasping a meaning of input multiple modalities.

With the development of a deep neural network (DNN)-based machine learning technology, lately the artificial intelligence technology is attracting attention in various fields. The artificial intelligence technology exhibits performance superior to existing technologies in various fields such as speech recognition, video recognition, automatic interpretation, and the like.

Meanwhile, the DNN technology makes it possible to learn a model for expressing an input-output pair by defining a desired output for an input. The DNN technology provides a structure which is apparent for recognizing names of various modality input, but it is difficult to find meaning information of various input modalities.

In other words, it is not possible to immediately find a meaning of an unknown input other than learned input-output pairs, and it is possible to grasp a meaning of an unknown input only by learning a sense-making process.

Also, when a sense-making process is learned, it is possible to implement an autonomously developing artificial intelligence capable of grasping meanings of similar input queries without learning a large amount of data.

To this end, exemplary embodiments of the present invention may provide the neural network memory computing system 100 and method for learning a process of grasping a meaning of a complex modality input and generating basic sense-making multimodal training data.

The neural network memory computing system 100 according to an exemplary embodiment of the present invention will be described below with reference to FIGS. 1 to 4.

FIG. 1 is a block diagram of a neural computing system according to an exemplary embodiment of the present invention.

The neural network memory computing system 100 according to an exemplary embodiment of the present invention includes a first processor 110 and a second processor 120.

The first and second processors 110 and 120 of the present invention may be separately configured as independent processors or may be configured as one processor and operate according to different functions. Also, although an element of functional blocks of FIG. 2, which will be described below, corresponds to neither the first processor 110 nor the second processor 120, it is apparent to those of ordinary skill in the art that the element is driven by any one of the first and second processors 110 and 120, which are hardware elements, or when the first and second processors 110 and 120 are configured as one processor, the element is driven by the single processor.

The first processor 110 learns a sense-making process on the basis of sense-making multimodal training data stored in a database 210 in a memory 140, receives multiple modalities, and outputs sense-making results on the basis of results of the learning.

The second processor 120 generates a sense-making training set for increasing knowledge for a sense-making process and provides the generated sense-making training set to the first processor 110.

Meanwhile, an exemplary embodiment of the present invention may additionally include a communication module 130 to transmit and receive data between the first and second processors 110 and 120 or receive multiple modalities from an external source.

The communication module 130 may include both a wired communication module and a wireless communication module. The wired communication module may be implemented as a power line communication device, a telephone line communication device, a cable home networking (Multimedia over Coax Alliance (MoCA)) device, an Ethernet device, an Institute of Electrical and Electronic Engineers (IEEE) 1294 device, an integrated wired home network device, and a recommended standard (RS)-485 control device. Also, the wireless communication module may be implemented with a wireless local area network (LAN) technology, a Bluetooth technology, a high data rate (HDR) wireless personal area network (WPAN) technology, an ultra-wideband (UWB) technology, a ZigBee technology, an impulse radio technology, a 60 GHz WPAN technology, a binary-code division multiple access (CDMA) technology, a wireless universal serial bus (USB) technology, a wireless high-definition multimedia interface (HDMI) technology, and the like.

An exemplary embodiment of the present invention may include memory spaces 237, 238, and 239 which store text modalities, visual modalities, and auditory modalities, respectively. The memory spaces 237, 238, and 239 or the aforementioned database 210 may be separately distinguished in the memory 140 or configured as a memory separate from the memory 140. Here, the memory 140 is a general term encompassing a volatile storage device and a non-volatile storage device which maintains stored information even when power is not supplied.

For example, the memory 140 may include a NAND flash memory such as a compact flash (CF) card, a secure digital (SD) card, a memory stick, a solid-state drive (SSD), and a micro SD card, a magnetic computer storage device such as a hard disk drive (HDD), an optical disk drive such as a compact disk-read only memory (CD-ROM) and a digital versatile disk-read only memory (DVD-ROM), and the like.

Detailed functions performed by the first and second processors 110 and 120 according to the configuration of FIG. 1 will be described in further detail below with reference to FIGS. 2 to 4.

Figure 2:
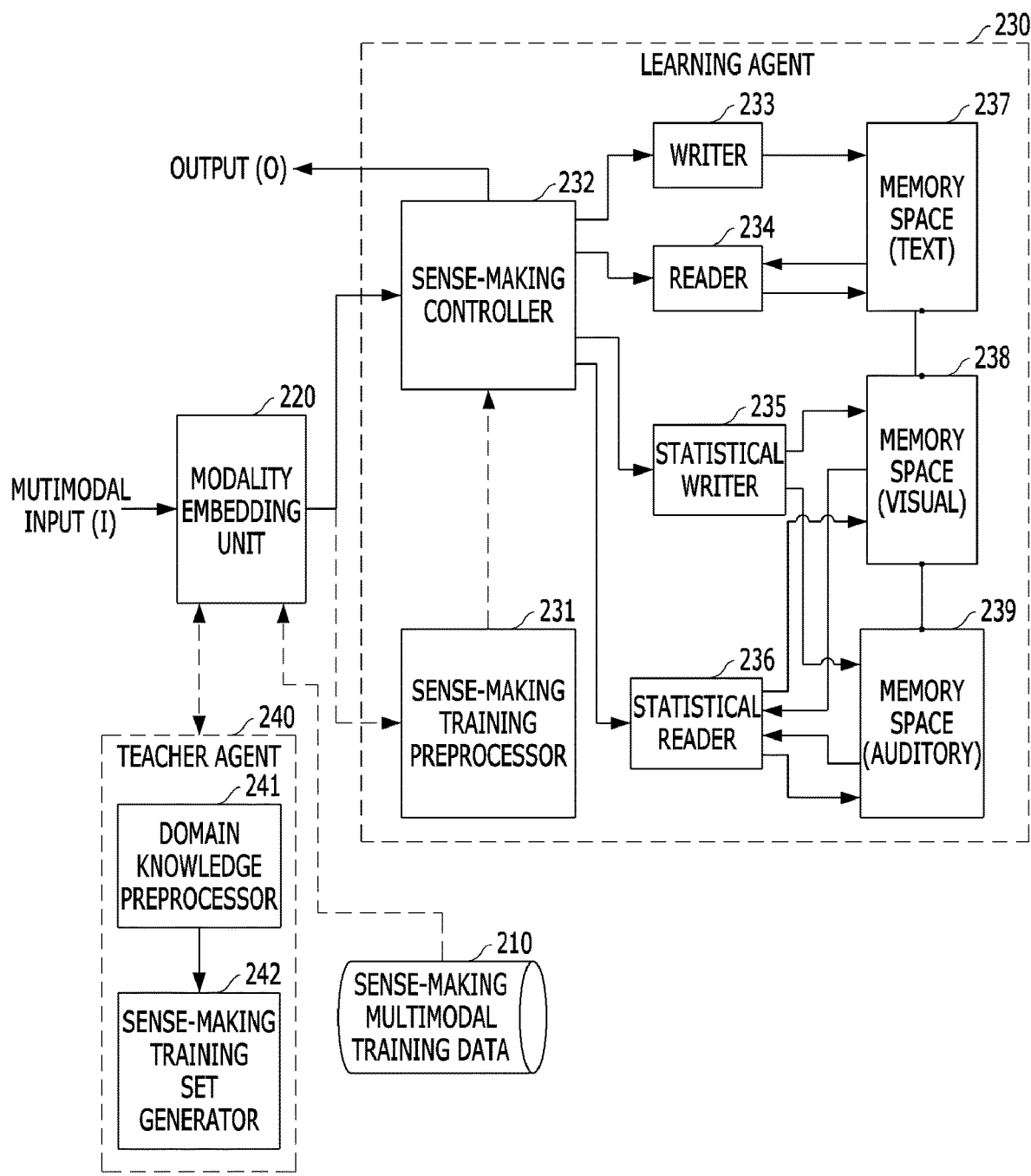
FIG. 2 is a diagram illustrating functionality of a neural computing system according to an exemplary embodiment of the present invention.

FIG. 2 is a diagram illustrating functionality of the neural computing system 100 according to an exemplary embodiment of the present invention. FIG. 3 is a diagram illustrating queries, answers, and associated information. FIG. 4 is a diagram illustrating a query generation DNN and a sense-making training set.

For convenience of description, the first processor 110 and the second processor 120 will be defined as a learning agent 230 and the teacher agent 240, respectively.

The neural network memory computing system 100 according to an exemplary embodiment of the present invention includes the learning agent 230 which receives multiple modalities and learns a sense-making process and the teacher agent 240 which generates sense-making training sets for increasing knowledge possessed by the learning agent 230. In addition, the neural network memory computing system 100 includes the database 210 in which sense-making multimodal training data is stored and a modality embedding unit 220.

According to an exemplary embodiment of the present invention, the learning agent 230 uses sense-making training sets for basic sense making. After that, the teacher agent 240 generates and transfers domain-specific sense-making training sets to the learning agent 230 for increasing knowledge, and the learning agent 230 performs learning for increasing sense-making knowledge.

First, operations performed by the learning agent 230 in an offline mode according to an exemplary embodiment of the present invention will be described. Here, the offline mode does not exclude an online condition. This means that the operations may also be performed in the online condition as well as other conditions. For convenience of description, in FIG. 2, broken lines and solid lines are defined to represent data transmission and reception processes in the offline mode and the online mode, respectively.

The learning agent 230 includes a sense-making training preprocessor 231, a sense-making controller 232, a writer 233, a reader 234, a statistical writer 235, a statistical reader 236, a text memory space 237, a visual memory space 238, and an auditory memory space 239.

The learning agent 230 learns a sense-making process in the offline mode. First, the modality embedding unit 220 coverts the sense-making multimodal training data stored in the database 210 into the form of vectors.

The sense-making multimodal training data is raw data of various modalities of text, the sense of sight, the sense of hearing, and the like. To process such multimodal training data at once, it is necessary to convert the multimodal training data into vector units, and the multimodal training data may be converted into vectors having the same magnitude.

The modality embedding unit 220 may learn a process of extracting features of auditory and visual pieces of the sense-making multimodal training data using a DNN and output final hidden values of the DNN for the auditory and visual pieces of sense-making multimodal training data, thereby performing embedding in units of vectors.

For a piece of the sense-making multimodal training data corresponding to text, the modality embedding unit 220 may learn a DNN-based word vector space using a previously provided large amount of text corpus and then output word vector values of the text, thereby performing embedding in units of vectors.

After a vector output of each modality is acquired through the modality embedding unit 220, the sense-making training preprocessor 231 performs a process of generating and preparing a sense-making training set. Here, the sense-making training set is configured to include a query and answer for sense making and associated information corresponding to the query and answer.

The sense-making training preprocessor 231 first determines whether the associated information corresponding to the query and answer for sense making is stored in the memory spaces 237, 238, and 239. When it is determined that the associated information corresponding to the query and answer is not stored, the sense-making training preprocessor 231 performs tagging for writing the associated information in the memory spaces 237, 238, and 239. Also, the sense-making training preprocessor 231 tags the input query as an input for sense-making training and an output for sense-making training and transfers the query and answer to the sense-making controller 232.

Figure 3:
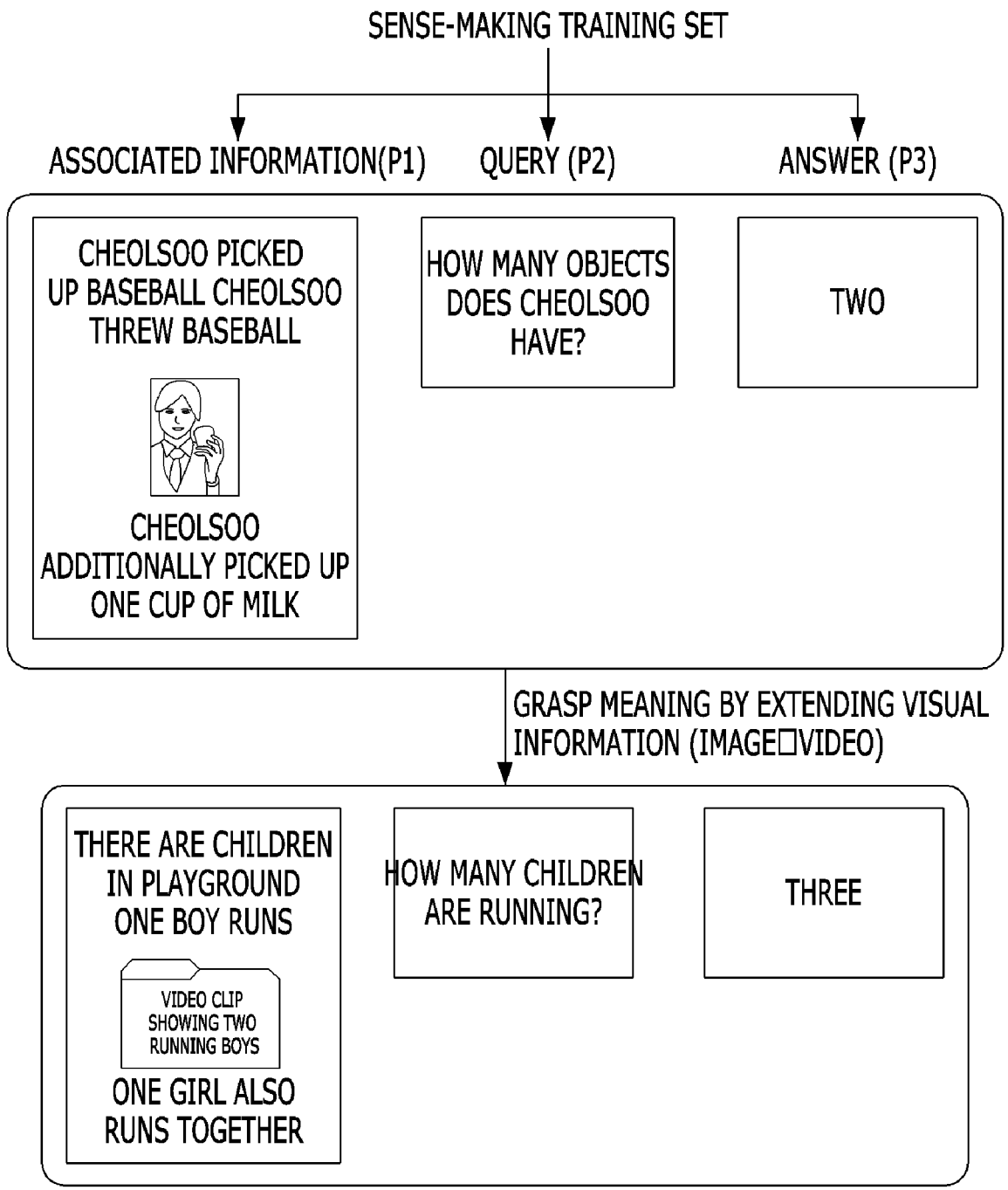
FIG. 3 is a diagram illustrating queries, answers, and associated information.

For example, referring to FIG. 3, it is possible to grasp meanings of a query "to have" P2 and an answer "to have" P3 by using the text "to grab a cup of milk" and an image in which a person is "holding an apple" as associated information P1. It is possible to grasp the same meaning from similar text or images in which a different object exists. Also, when not only an image but also video information is mixed with text, it is possible to grasp meanings of various visual input, such as images, videos, and the like.

Referring back to FIG. 2, the sense-making controller 232 may classify input tagged for writing as a text modality, a visual modality, and an auditory modality among multiple modalities included in the sense-making training set prepared by the sense-making training preprocessor 231 and store the classified input in the memory spaces 237, 238, and 239 in units of vectors.

Subsequently, the sense-making controller 232 may set modalities tagged as a sense-making training input among the multiple modalities included in the sense-making training set as an input to the DNN, set modalities tagged as a sense-making training output as an output of the DNN, and learn the DNN.

In other words, the sense-making controller 232 may learn the DNN using input and output data constituting the sense-making training set. In this process, the sense-making controller 232 reads associated pieces of data from the memory spaces 237, 238, and 239, repeatedly sets the read pieces of data as input to the DNN, and learns the DNN.

At this time, the pieces of data read from the memory spaces 237, 238, and 239 are information to pay attention to for the query and answer within the sense-making training set during a process of learning the DNN. During a process of learning a method of automatically noticing information required for queries and answers, a sense-making method is effectively learned.

Through the DNN, the sense-making controller 232 may learn how much data to be noticed will be read from the memory spaces 237, 238, and 239 and to what degree memory space data related to query-answer pairs will be changed.

During a process of reading and writing memory space data, text represents one linguistic meaning, whereas visual and auditory memory data may have various meanings depending on situations during a query-answer process.

For this reason, visual and auditory memory data related to query-answer pairs, which are targets of learning, differs from a process of storing text in that data having a meaning with a high probability among various meanings. The visual and auditory memory data related to query-answer pairs is provided to the sense-making controller 232 during a reading process and is updated by the sense-making controller 232 as much as a probability value according to a current meaning during a writing process.

Next, operations in the online mode according to an exemplary embodiment of the present invention will be described below.

The sense-making controller 232 in the online mode performs a process of embedding an arbitrary multimodal input I including input queries and associated information in units of vectors having a preset magnitude. The sense-making controller 232 reads the associated information and related data in the memory spaces 237, 238, and 239, repeatedly inputs the associated information and the related data to the DNN together with queries, and provides a sense-making result as an output O.

At this time, using a weight output from the DNN, the sense-making controller 232 may update data whose associated information is related to the sense-making result among pieces of data related to the output O in the memory spaces 237, 238, and 239. For example, text data may be updated as much as the weight, and visual and auditory memory data may be updated using a probability according to the sense-making result.

Meanwhile, the neural network memory computing system 100 according to an exemplary embodiment of the present invention includes the teacher agent 240 including a domain knowledge preprocessor 241 and a sense-making training set generator 242 together with the learning agent 230.

According to an exemplary embodiment of the present invention, the learning agent 230 may operate in the same way as in the offline mode to improve sense-making knowledge through cooperation between the teacher agent 240 and the learning agent 230.

In this case, however, sense-making multimodal training data stored in the database 210 is not provided to the learning agent 230, and the teacher agent 240 generates and provides sense-making training sets corresponding to sense-making multimodal training data.

To this end, the teacher agent 240 samples domain information from the domain knowledge preprocessor 241 and provides the sampled domain information to the sense-making training set generator 242. The sense-making training set generator 242 may learn a query generation DNN, which generates sense-making training sets for generating various queries from an answer, using a domain query-answer set previously constructed on the basis of the sampled domain information. In other words, using the domain information, the teacher agent 240 learns the query generation DNN for generating a set of queries, answers, and associated information.

For example, referring to FIG. 4, the teacher agent 240 learns a query generation DNN using associated information P4 and query-answer data P5 and P6 previously constructed on the basis of domain information.

In other words, the teacher agent 240 may call a text input corresponding to an answer, text whose associated information is related to the text input, and visual and auditory modality information from the modality embedding unit 220, convert the text input, the text, and the visual and auditory modality information into vectors, set the vectors as input to the query generation DNN, set text converted into a vector corresponding to a query as an output of the query generation DNN, and learn a process of generating a query, thereby learning the query generation DNN.

Accordingly, when similar associated information P4 is given, the teacher agent 240 may set an arbitrary word as an answer P6 and then generate a query P5 including the answer P6 and the associated information P4.

For reference, components shown in FIGS. 1 and 2 according to exemplary embodiments of the present invention may be implemented in a software form or a hardware form, such as a field programmable gate array (FPGA) or an application specific integrated circuit (ASIC), and may play certain roles.

However, components are not limited to software or hardware. Each component may be configured to reside in an addressable medium or to execute one or more processors.

Therefore, components include, by way of example, software components, object-oriented software components, class components, task components, processes, functions, attributes, procedures, subroutines, segments of program code, drivers, firmware, microcode, circuitry, data, databases, data structures, tables, arrays, and variables.

Components and functions provided by the components may be combined into a smaller number of components or subdivided into additional components.

A neural network memory computing method according to an exemplary embodiment of the present invention will be described below with reference to FIGS. 5A and 5B.

Figure 5A:
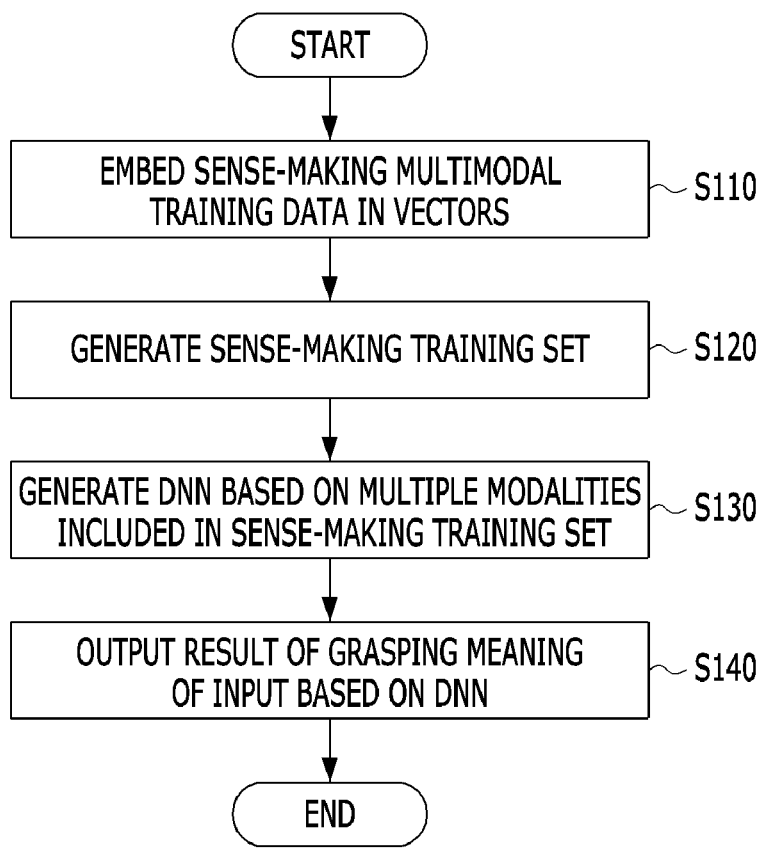

FIGS. 5A and 5B are flowcharts illustrating a neural network memory computing method according to an exemplary embodiment of the present invention.

A process performed by the learning agent 230 is described with reference to FIG. 5A. First, the learning agent 230 embeds sense-making multimodal training data stored in a database in vectors having a preset magnitude (S110).

Next, the learning agent 230 generates a sense-making training set on the basis of the vectors (S120) and learns a DNN on the basis of multiple modalities included in the generated sense-making training set (S130).

Subsequently, when arbitrary multiple modalities are input, the learning agent 230 outputs a result of grasping a meaning of the input on the basis of the learned DNN (S140).

Meanwhile, as shown in FIG. 5B, the teacher agent 240 samples domain information first (S210).

Next, the teacher agent 240 learns a query generation DNN using a domain query-answer set constructed on the basis of the sampled domain information (S220) and generates a sense-making training set on the basis of the learned query generation DNN (S230).

At this time, the query generation DNN may call a text input and modality information whose associated information is related to the text input, convert the text input and the modality information into vectors, set the vectors as input to the query generation DNN, set text converted into a vector corresponding to a query as an output of the query generation DNN, and learn the query generation DNN.

In the above description, operations S110 to S230 may be subdivided into additional operations or combined into a smaller number of operations. Also, some operations may be omitted as necessary, and a sequence of operations may be changed. Although omitted in the above description, other descriptions which have been provided regarding the neural network memory computing system 100 of FIGS. 1 to 4 are also applied to the neural network memory computing method of FIGS. 5A and 5B.

According to an exemplary embodiment of the present invention, it is possible to learn a sense-making process by storing information composed of various modalities and calling the stored information through a query-answer learning set for sense making. In this way, an exemplary embodiment of the present invention makes it possible to grasp meanings of unknown information and a query.

Also, according to an exemplary embodiment of the present invention, even when there is not a large amount of data for sense making, it is possible to grasp a meaning of an input composed of various modalities.

Further, according to an exemplary embodiment of the present invention, it is possible to automatically increase sense-making knowledge by learning a method of generating a sense-making training set even when the knowledge extends to various domains.

Meanwhile, an exemplary embodiment of the present invention may be implemented in the form of a computer program stored in a medium executed by a computer or a recording medium including instructions executable by a computer. Computer-readable media may be any available media that can be accessed by a computer and include all of volatile and non-volatile media and removable and non-removable media. Also, computer-readable media may include both computer storage media and communication media. Computer storage media may include all of volatile and non-volatile media and removable and non-removable media implemented in any method or technology for storing information such as computer-readable instructions, data structures, program modules, or other data. Communication media typically include computer-readable instructions, data structures, program modules, or other data in a modulated data signal such as a carrier wave and include any information delivery media.

Although the method and system of the present invention have been described in connection with specific embodiments, some or all of the components or operations thereof may be implemented using a computer system which has hardware architecture for general use.

The foregoing description of the present invention is for illustrative purposes, and those of ordinary skill in the art to which the present invention pertains will appreciate that other specific modifications can be easily made without departing from the technical spirit or essential features of the present invention. Therefore, the foregoing embodiments should be regarded as illustrative rather than limiting in all aspects. For example, each component which has been described as a single form may be implemented in a distributed manner, whereas components which have been described as being distributed may be implemented in a combined form.

The scope of the present invention is not defined by the detailed description as set forth above but by the following claims. It should also be understood that all changes or modifications derived from the definitions and scopes of the claims and their equivalents fall within the scope of the present invention.

What is claimed is:

1. A neural network memory computing system for increasing knowledge for grasping a meaning of input multiple modalities, the system comprising:
   a first processor configured to learn a sense-making process based on sense-making multimodal training data stored in a database, receive multiple modalities, and output a sense-making result based on results of the learning; and
   a second processor configured to generate a sense-making training set for the first processor to increase knowledge for learning a sense-making process and provide the generated sense-making training set to the first processor, wherein the first processor embeds the input multiple modalities including a query and associated information in units of vectors having a preset magnitude, repeatedly inputs the embedded multiple modalities including the query and associated information in a deep neural network (DNN), and wherein using a weight output from the DNN, the first processor updates a piece of data whose sense-making result is related to associated information corresponding to a query and answer for sense making among pieces of data in a memory space in which the associated information is stored.

2. The neural network memory computing system of claim 1, wherein the first processor embeds the sense-making multimodal training data in units of vectors having a preset magnitude and generates a sense-making training set based on the vectors.

3. The neural network memory computing system of claim 2, wherein the first processor learns a process of extracting features of visual and auditory pieces of the sense-making multimodal training data using a deep neural network (DNN), outputs final hidden-layer values of the DNN for the visual and auditory pieces of sense-making training data, and embeds the final hidden-layer values in the vectors.

4. The neural network memory computing system of claim 2, wherein, for a piece of the sense-making multimodal training data corresponding to text, the first processor learns a deep neural network (DNN)-based word vector space using a previously provided text corpus, outputs word vector values of the text, and embeds the word vector values in the vectors.

5. The neural network memory computing system of claim 2, wherein when associated information corresponding to a query and answer for sense making is not stored in a memory space, the first processor performs tagging for writing the associated information in the memory space and tags the input query as a sense-making training input and a sense-making training output to generate the sense-making training set for the query and answer.

6. The neural network memory computing system of claim 5, wherein the first processor classifies input tagged for writing as a text modality, a visual modality, and an auditory modality among multiple modalities included in the sense-making training set and stores the classified input in the memory space.

7. The neural network memory computing system of claim 6, wherein the first processor sets modalities tagged as the sense-making training input among the multiple modalities included in the sense-making training set as an input to a deep neural network (DNN), sets modalities tagged as the sense-making training output as an output of the DNN, and learns the DNN.

8. The neural network memory computing system of claim 1, wherein the first processor outputs the sense-making result.

9. The neural network memory computing system of claim 1, wherein the second processor samples domain information and learns a query generation deep neural network (DNN) which generates the sense-making training set using a domain query-answer set constructed based on the sampled domain information.

10. The neural network memory computing system of claim 9, wherein the second processor calls a text input corresponding to an answer and modality information whose associated information is related to the text input, converts the text input and the modality information into vectors, sets the vectors as input to the query generation DNN, sets text converted into a vector corresponding to a query as an output of the query generation DNN, and learns the query generation DNN.

11. A neural network memory computing method for increasing knowledge for grasping a meaning of input multiple modalities, the method comprising:
embedding sense-making multimodal training data stored in a database in vectors having a preset magnitude;
generating a sense-making training set based on the vectors;
learning a deep neural network (DNN) based on multiple modalities included in the generated sense-making training set; and
outputting results of grasping a meaning of input multiple modalities based on the learned DNN,
wherein the embedding of the sense-making multimodal training data in the vectors having the preset magnitude comprises learning a process of extracting features of visual and auditory pieces of the sense-making multimodal training data using the DNN, outputting final hidden-layer values of the DNN for the visual and auditory pieces of sense-making training data.

12. The neural network memory computing method of claim 11, wherein the embedding of the sense-making multimodal training data in the vectors having the preset magnitude comprises embedding the final hidden-layer values in the vectors.

13. The neural network memory computing method of claim 11, wherein the embedding of the sense-making multimodal training data in the vectors having the preset magnitude comprises, for a piece of the sense-making multimodal training data corresponding to text, learning a DNN-based word vector space using a previously provided text corpus, outputting word vector values of the text, and embedding the word vector values in the vectors.

14. The neural network memory computing method of claim 13, wherein the generating of the sense-making training set based on the vectors comprises:
determining whether associated information corresponding to a query and answer for sense making is stored in a memory space;
when it is determined that the associated information is not stored in the memory space, performing tagging for writing the associated information in the memory space; and
tagging an input query as a sense-making training input and a sense-making training output to generate the sense-making training set for the query and answer.

15. The neural network memory computing method of claim 14, wherein the learning of the DNN based on the multiple modalities included in the generated sense-making training set comprises:
classifying input tagged for writing as a text modality, a visual modality, and an auditory modality among the multiple modalities included in the sense-making training set and storing the classified input in the memory space;
setting modalities tagged as the sense-making training input among the multiple modalities included in the sense-making training set as input to the DNN; and
setting modalities tagged as the sense-making training output as output of the DNN and learning the DNN.

16. The neural network memory computing method of claim 11, wherein the outputting of the results of grasping a meaning of the input multiple modalities based on the learned DNN comprises:

embedding the multiple modalities including an input query and associated information in units of vectors having the preset magnitude; and repeatedly inputting the embedded multiple modalities including the query and associated information in the DNN and outputting sense-making results.

17. The neural network memory computing method of claim 16, wherein the outputting of the results of grasping a meaning of the input multiple modalities based on the learned DNN further comprises updating, using a weight output from the DNN, a piece of data whose sense-making result is related to associated information corresponding to a query and answer for sense making among pieces of data in a memory space in which the associated information is stored.

18. A neural network memory computing method for increasing knowledge for grasping a meaning of input multiple modalities, the method comprising:

sampling multiple domain information;

learning a query generation deep neural network (DNN) using a domain query-answer set constructed based on the sampled multiple domain information; and generating a sense-making training set based on the query generation DNN, wherein the learning of the query generation DNN comprises calling a text input and modality information whose associated information is related to the text input, converting the text input and the modality information into vectors, setting the vectors as input to the query generation DNN, setting text converted into a vector corresponding to a query as an output of the query generation DNN, and learning the query generation DNN, and wherein the generating a sense-making training set based on the query generation DNN comprises automatically increasing a sense-making knowledge when the increased knowledge extends to multiple domain information.

* * * * *